United States Patent
Fang et al.

(10) Patent No.: US 11,425,292 B1
(45) Date of Patent: Aug. 23, 2022

(54) METHOD AND APPARATUS FOR CAMERA-FREE LIGHT FIELD IMAGING WITH OPTOELECTRONIC INTELLIGENT COMPUTING

(71) Applicant: Tsinghua University, Beijing (CN)

(72) Inventors: Lu Fang, Beijing (CN); Yong Wang, Beijing (CN); Xiaoyun Yuan, Beijing (CN); Tiankuang Zhou, Beijing (CN); Qionghai Dai, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 0 days.

(21) Appl. No.: 17/678,759

(22) Filed: Feb. 23, 2022

(30) Foreign Application Priority Data

Oct. 8, 2021 (CN) .......................... 202111168889.0

(51) Int. Cl.
*G02F 1/365* (2006.01)
*H04N 5/225* (2006.01)
(Continued)

(52) U.S. Cl.
CPC ....... *H04N 5/22541* (2018.08); *G02F 1/3501* (2013.01); *G02F 1/365* (2013.01); *G06N 3/04* (2013.01)

(58) Field of Classification Search
CPC ......... G02F 1/3501; G02F 1/365; G06N 3/04; H04N 5/22541
See application file for complete search history.

(56) References Cited

U.S. PATENT DOCUMENTS 9,735,303 B2 * 8/2017 Ludwig ................ H04N 9/0451
2010/0265384 A1 10/2010 Tay et al.
(Continued)

FOREIGN PATENT DOCUMENTS

| CN | 101136367 | 3/2008 |
| CN | 101477253 | 7/2009 |

(Continued)

OTHER PUBLICATIONS

Yan et al., "Saliency Segmentation with Fourier-space Diffractive Deep Neural Networks," Conference on Lasers and Electro-Optics (CLEO), 2020.
(Continued)

*Primary Examiner* — Daniel Petkovsek
(74) *Attorney, Agent, or Firm* — Hodgson Russ LLP

(57) ABSTRACT

A method and an apparatus for camera-free light field imaging with optoelectronic intelligent computing are provided. The method includes: obtaining an optical computing result by an optical computing module in response to receiving a light signal of an object to be imaged, in which the optical computing result includes light field imaging of the object to be imaged; computing by an electronic computing module the optical computing result to obtain an electronic computing result; and in response to determining based on the electronic computing result that cascading is required, forming a cascade structure by taking the electronic computing result at a previous level as an input of the optical computing module at a current level, and in response to determining that cascading is not required, outputting a final result.

8 Claims, 2 Drawing Sheets

(51) Int. Cl.
    *G06N 3/04*     (2006.01)
    *G02F 1/35*     (2006.01)

(56) References Cited

U.S. PATENT DOCUMENTS

| | | |
|---|---|---|
| 2013/0002928 A1 | 1/2013 | Imai |
| 2019/0025668 A1 | 1/2019 | Tzang et al. |

FOREIGN PATENT DOCUMENTS

| | | |
|---|---|---|
| CN | 102833487 | 12/2012 |
| CN | 109167924 | 1/2019 |
| CN | 109451286 | 3/2019 |
| CN | 110178045 | 8/2019 |
| CN | 111106872 | 5/2020 |
| CN | 111182191 | 5/2020 |
| CN | 111366557 | 7/2020 |
| CN | 112699917 | 4/2021 |
| CN | 112784711 | 5/2021 |
| CN | 113014837 | 6/2021 |
| CN | 113408720 | 9/2021 |

OTHER PUBLICATIONS

Wang, "Research on new photoelectric range finder and three dimensional imaging," Dissertation for Doctor's Degree, University of Science and Technology of China, Apr. 2009.

Zhang et al., "Survey on Imaging Model and Calibration of Light Field Camera," Chinese Journal of Lasers, Jun. 2016, vol. 43, No. 6.

CNIPA, First Office Action for CN Application No. 202111168889.0, dated Nov. 25, 2021.

CNIPA, Notification to Grant Patent Right for Invention for CN Application No. 202111168889.0, dated Dec. 15, 2021.

\* cited by examiner

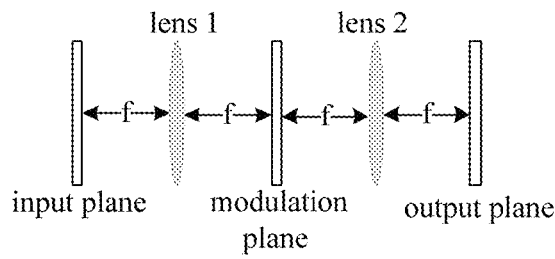
FIG. 3b
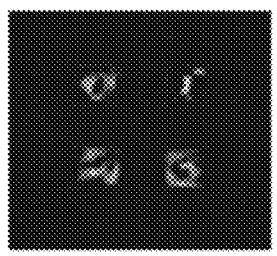   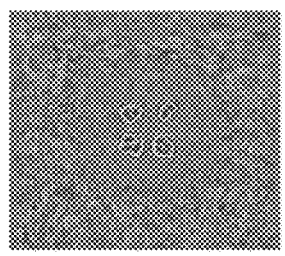   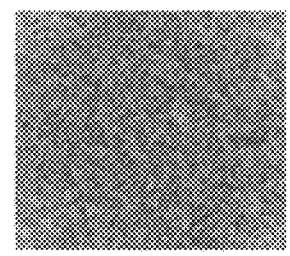
FIG. 4a      FIG. 4b      FIG. 4c
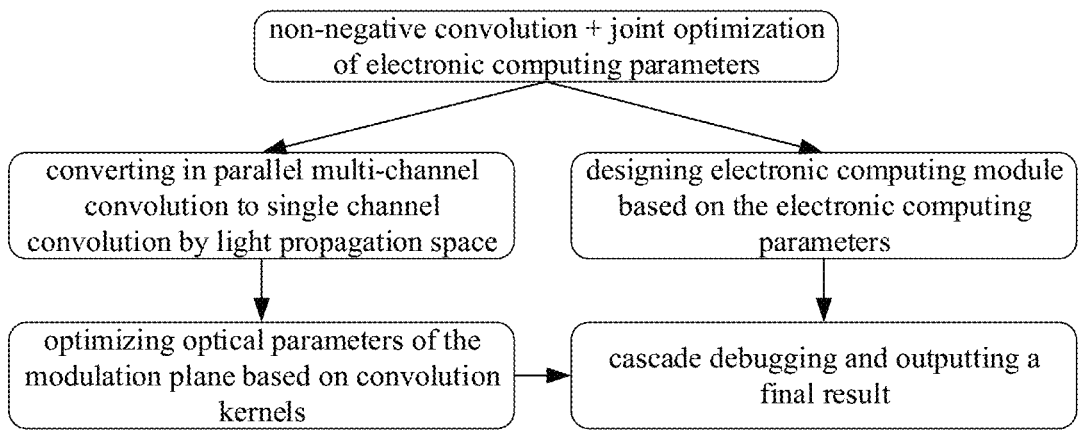
FIG. 5
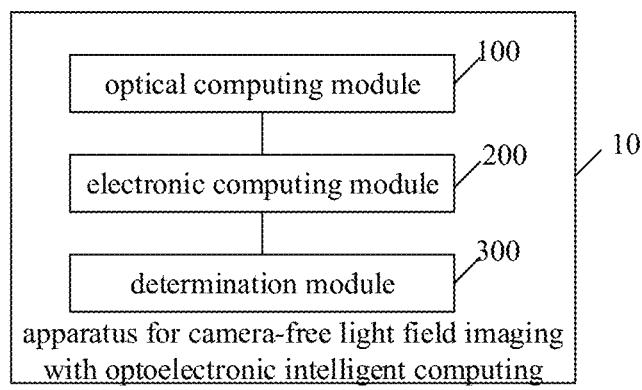
FIG. 6

METHOD AND APPARATUS FOR CAMERA-FREE LIGHT FIELD IMAGING WITH OPTOELECTRONIC INTELLIGENT COMPUTING

CROSS-REFERENCE TO RELATED APPLICATION

This application claims priority to Chinese Patent Application No. 202111168889.0, filed on Oct. 8, 2021, the entire content of which is incorporated by reference herein.

TECHNICAL FIELD

The disclosure relates to the technical field of light field processing, and particularly to a method and an apparatus for camera-free light field imaging with optoelectronic intelligent computing.

BACKGROUND

In recent years, the development of deep neural networks has brought great progress in the technical field of light field processing, such as light field image recognition and object segmentation. In current systems, a light field camera is required to capture the light field image/video, and specific hardware devices are required to run artificial intelligence algorithms based on the deep neural networks, such as graphics processing units (GPU), embedded neural-network processing units (NPU), and field-programmable gate arrays (FPGAs).

SUMMARY

According to a first aspect of the disclosure, a method for camera-free light field imaging with optoelectronic intelligent computing, includes: obtaining an optical computing result by an optical computing module in response to receiving a light signal of an object to be imaged, in which the optical computing result includes light field imaging of the object to be imaged; calculating the optical computing result by an electronic computing module to obtain an electronic computing result; and in response to determining based on the electronic computing result that cascading is required, forming a cascade structure by taking the electronic computing result at a previous level as an input of the optical computing module at a current level, and in response to determining that cascading is not required, outputting a final result.

According to a second aspect of the disclosure, an apparatus for camera-free light field imaging with optoelectronic intelligent computing includes an optical computing module, an electronic computing module and a processor. The optical computing module may be configured to obtain an optical computing result in response to receiving a light signal of an object to be imaged, in which the optical computing result includes light field imaging of the object to be imaged. The electronic computing module may be configured to obtain an electronic computing result by calculating the optical computing result. The processor may be configured to in response to determining based on the electronic computing result that cascading is required, form a cascade structure by taking the electronic computing result at a previous level as an input of the optical computing module at a current level, and in response to determining that cascading is not required, output a final result.

The additional aspects and advantages of the disclosure may be set forth in the following specification, and will become obvious from the following description, or may be learned by practice of the disclosure.

BRIEF DESCRIPTION OF THE DRAWINGS

The above and/or additional aspects and advantages of the present disclosure may be obvious and easily understood in descriptions of embodiments in combination with figures.

FIG. 3b is a schematic diagram illustrating a frequency-domain modulation mode according to an embodiment of the disclosure.

FIG. 4a to FIG. 4c is a schematic diagram illustrating modulation plane parameters for an output plane according to an embodiment of the disclosure.

FIG. 5 is a schematic diagram illustrating camera-free light field imaging with optoelectronic intelligent computing according to an embodiment of the disclosure.

FIG. 6 is a structural schematic diagram illustrating an apparatus for camera-free light field imaging with optoelectronic intelligent computing according to an embodiment of the disclosure.

DETAILED DESCRIPTION

Figure 1:
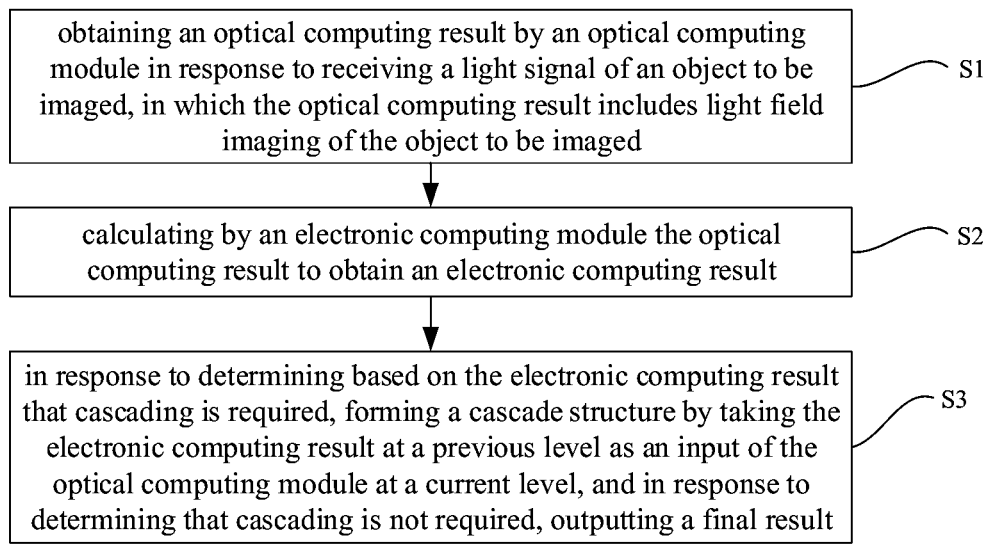
FIG. 1 is a flowchart illustrating a method for camera-free light field imaging with optoelectronic intelligent computing according to an embodiment of the disclosure.

Embodiments of the disclosure are described in detail below, and examples of embodiments are illustrated in the accompanying drawings, in which the same or similar reference numbers represent the same or similar elements or elements with the same or similar functions. The embodiments described below with reference to the drawings are exemplary, are intended to explain the present disclosure and are not to be construed as a limitation of the disclosure.

In the related solution, the light emitted or reflected from a target scene is projected through an optical lens onto a photosensitive chip (i.e., the CMOS sensor in the camera), so that an optical signal is converted into an electronic signal. The analog-to-digital conversion of the sensor is performed on the electronic signal again to obtain an electronic signal in a common data form (such as light field images or videos).

Due to the limitation of the light field camera, lots of information is lost during the imaging. For example, a conventional photosensitive chip is not sensitive to the polarization and phase. While these information can be preserved in optoelectronic computing. In the proposed method, the light field imaging and optoelectronic intelligent computing can be achieved simultaneously so that the camera is not required in the whole imaging and computing setup for intermediate recording.

Current mainstream computing devices face the following problems: (i) the GPUs have high energy consumption and high bandwidth, which causes the GPUs to be not suitable for deployment on smart edge computing terminals (such as, commercial cameras, autonomous vehicles, etc.); (ii) the device computing power and power consumption for embedded device hardware such as NPU and FPGA are inherently limited, which cannot meet real-time vision tasks (such as, autonomous driving, real-time monitoring, etc.) that require a lot of computing resources and high computing power consumption; (iii) Moore's law fails, and the development of conventional silicon-based computing chips has slowed down and it is difficult to keep up with the demands from artificial intelligence algorithms.

For the above problems, researchers have proposed that light can be used to realize neural network computations, which is known as optical computing. In a mainstream proposal, artificial neural networks (ANN) are simulated by the propagation of coherent light in free space or waveguides, such as deep diffractive neural networks (D2NN), waveguide chips, etc. In another mainstream proposal, convolutional neural networks (CNN) and spiking neural networks (SNN) are simulated by crystalline state change of phase change material (PCM) induced by light pulses. Optical computing may overcome inherent limitations of the mainstream electronic computing and have such advantages of high speed, high parallelism, high computing throughput and low energy consumption. The neural network algorithms achieved by optical computing has become a current research hotspot in the world. In addition, the light signal emitted by an object or a scene to be imaged may be directly calculated by optical computing, which thus avoids effective information loss and the limited processing speed caused by photoelectric conversion and analog-to-digital conversion of the image sensors.

Since non-linear operations in the neural network are essential to improve the network performance and it is not mature yet to perform the non-linear operations based on pure optics, combining the optical computing with the electronic computing is a mainstream operation in the current technical system, which is known as an optoelectronic computing. In the optoelectronic computing, the optical computing and electronic computing have complementary advantages, in which most of the calculations is undertaken by the optical computing while operations currently difficult to achieve by the optical technology are completed by the electronic computing, which thus achieves a compromise between performance improvement and implementation difficulty.

Currently, there are mainly two approaches (based on waveguide technology and spatial light propagation) in the scope of optoelectronic computing. For the waveguide-based technology, a simple ANN or SNN can be realized by a cascade array of 56 Mach-Zehnder interferometers to classify 4 vowel acoustic signals, or by the property of phase change materials switching from crystalline to non-crystalline state under illumination.

In the spatial light propagation approach, light is modulated by different types of components to complete different types of operations, such as a thin lens, a phase mask, a spatial light modulator, etc. D2NN is relatively important in the spatial light propagation approach, in which a coherent light (laser) propagates and diffracts freely in the space for a certain distance and then passes through a phase mask, the phase of each point may produce different delays, and the coherent light propagates freely and diffracts for a certain distance, and so on. The phase mask parameters of each level in the D2NN can be obtained through physical simulation optimization, so as to complete specific artificial intelligence tasks, such as handwritten-digit classification, simple picture classification, etc. The D2NN is a pure optical computing, which can be combined with simple electronic computing and the inherent square nonlinear relationship in the physical process of photoelectrical conversion, to form a more advanced optoelectronic computing scheme, thereby improving the classification accuracy.

In terms of light field intelligent imaging, some computational imaging technologies use a single optical layer (such as, an optical element or optical unit) to complete a preprocessing or information encoding step, such as placing a fixed phase mask or diffuser before the imaging lens or image sensor, etc., so that the scene is first modulated by the optical layer, then recorded by the image sensor, and finally calculated and processed by the algorithm, which forms an optical encoding-electronic decoding structure. The physical parameters in the optical layer and the back-end decoding algorithm can be obtained through joint optimization to perform specific visual tasks. For example, the point spread function of the imaging system can be expanded through a specific phase mask, so that a signal at a certain pixel area overexposed is spread to its adjacent pixel area, information of the over-exposed area is then recovered from the adjacent pixel area with the back-end algorithm, thereby avoiding information loss and realizing high dynamic range imaging. For another example, a common 4f system in optics can be used to complete the convolution operation. The input scene passing through a 4f unit can be regarded as a convolution operation on the input scene, so that features can be extracted from the input image, and other operations are then performed by the back end through the neural network.

In summary, there are the following shortcomings in the related works. Firstly, in the current optoelectronic computing technology, the solution based on the waveguide technology has a complicated process, in which the number of components required has a square growth relationship with task dimensions (i.e., a complex task corresponds to many components), resulting in excessive manufacturing costs, and it is difficult to apply the components to the complex task since noises and crosstalk phenomenon are more serious as the number of components increases. In the solution based on spatial light propagation, a coherent light (laser) is basically used. Most of the light sources in human life are incoherent light, and additional light sources since are required for the optoelectronic computing by using the coherent light, which is not conducive to deployment in edge computing devices. Secondly, in the current light field intelligent imaging research, the light signal from the scene or object to be imaged only passes through a single optical layer to complete information encoding or modulation, and all calculating and reconstructing tasks at the back-end are completed by the electronic computing (usually through the neural networks). Higher power consumption is required. On the other hand, this kind of method is still based on a framework of imaging first and then processing, which requires an analog-to-digital conversion and additional storage, which is not conducive to realization of camera-free light field imaging with optoelectronic intelligent computing.

Hereinafter, a method and an apparatus for camera-free light field imaging with optoelectronic intelligent computing according to an embodiment of the disclosure will be described with reference to the accompanying drawings.

Figure 2:
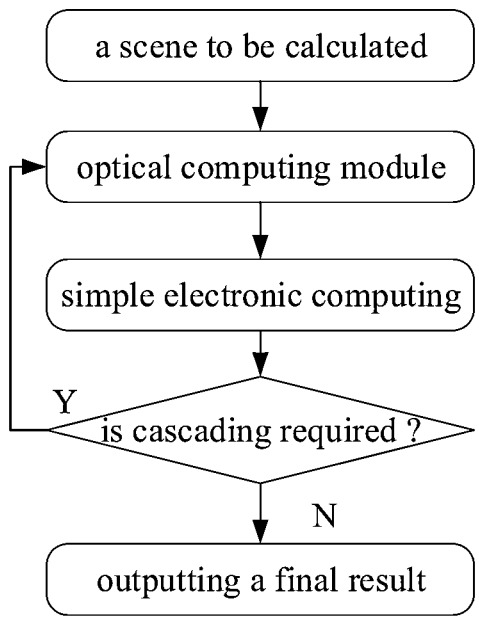
FIG. 2 is a schematic diagram illustrating a process for camera-free light field imaging with optoelectronic intelligent computing according to an embodiment of the disclosure.

In the method proposed in the disclosure, a light signal from a scene or an object to be imaged is firstly received by an optical computing module; optical computing results are then further processed through simple electronic computing, such as performing a nonlinear operation etc.; it is then judged whether cascading is required; in response to requiring the cascading, a cascade structure is formed by taking the electronic computing result at a previous level as an input of the optical computing module at a current level; and in response to not requiring the cascading, a final result is outputted. The overall structure diagram is shown in FIG. 2.

FIG. 1 is a flowchart illustrating a method for camera-free light field imaging with optoelectronic intelligent computing according to an embodiment of the disclosure.

As shown in FIG. 1, the method includes the following steps S1-S3.

At S1, an optical computing result is obtained in response to receiving a light signal of a scene or an object to be imaged by an optical computing module. The optical computing result includes light field imaging of the scene or object to be imaged.

Figure 3A:
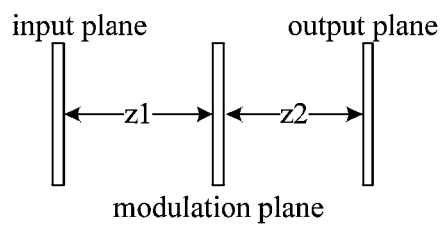
FIG. 3a is a schematic diagram illustrating a spatial-domain modulation mode according to an embodiment of the disclosure.

Specifically, the input scene or the electronic computing result at a previous level passes through the optical computing module. It may be understood that the optical computing module mainly has two modes as shown in FIG. 3a and FIG. 3b. In the first type of spatial modulation shown in FIG. 3a, the light signal of the input plane freely propagates to the modulation plane for modulation, and then freely propagates to the output plane. Based on Fresnel diffraction in Fourier optics, it can be deduced that the impulse response function on the output plane corresponding to a point light source (u, v) on the input plane can be expressed in the equation (1) under the paraxial approximation.

$$h(u, v; \xi, \eta) = \left| \int \int g(x, y) f(u - \xi', v - \eta'; x, y) dx dy \right|^2 \quad (1)$$

where $g(x,y)$ is a function related to a spacing z1/z2 between two elements and modulation plane parameters $\phi(x, y)$, which is expressed in the equation (2); $f(u-\xi',v-\eta';x,y)$ is only related to a point coordinate difference between the input plane and the output plane, which is expressed in the equation (3).

$$g(x, y) = \exp\left\{\frac{jk(z_1 + z_2)}{2z_1 z_2}(x^2 + y^2) + j(\phi)(x, y)\right\} \quad (2)$$

$$f(u - \xi', v - \eta'; x, y) = \exp\left\{-\frac{jk}{2z_2}[(u - \xi')x + (y - \eta')y]\right\} \quad (3)$$

It can be seen that the impulse intensity response is only related to the point coordinate difference between the input plane and the output plane, so the intensity of the output plane is a convolution of the intensity on the input plane and the function $h(u,v;\xi,\eta)$.

In the second type of frequency domain modulation (i.e., a common 4f system) where the modulation plane is located at a Fourier plane of a first lens. As shown in FIG. 3b, the light signal of the input plane passes through a lens 1, the modulation plane (for being modulated), and a lens 2 and reaches the output plane, in which a distance between every two planes is a focal length of the lens. Based on the Fourier optics, under the conditions of coherent light (laser) illumination and paraxial approximation, the signals on a front focal plane and a back focal plane of the thin lens satisfy the Fourier transform relationship. The modulation plane parameters are denoted as $\phi(x, y)$. The light signal $t_{out}(x, y)$ of the output plane and the light signal $t_{in}(x, y)$ of the input plane may satisfy the equation (4) where $F\{\ \}$ represents a Fourier transform.

$$t_{out}(x,y)=F\{t_{in}(x,y)\exp\{j\phi(x,y)\}\}=t_{in}(-x,-y)\\ *F\{\exp\{j\phi(x,y)\}\} \quad (4)$$

It can be seen that the signal of the output plane can also be regarded as a convolution of the light signal of the input plane and a fixed kernel function. Under incoherent illumination, only intensity information needs to be considered. At this time, an output intensity and input intensity still satisfy a convolution relationship which is expressed in the equation (5).

$$I_{out}(x,y)=I_{in}(-x,-y)*|F\{\exp\{j\phi(x,y)\}\}|^2 \quad (5)$$

Since the distance between the scene to be captured and the lens is much larger than lens aperture in real life, it can be considered that the paraxial approximation is one that meets realistic conditions and does not lose generality. From the above derivation in the equations (1) to (5), it can be seen that the two types of optical computing module are mathematically convolution operations, which may be regarded as optical convolution modules (i.e., the calculation operations performed by the optical computing modules are convolution operations). In fact, the convolution in the electronic computing implementation of neural networks is the most time-consuming and energy-consuming operation with the largest calculation amount and the most memory required. In the embodiment of the disclosure, the convolution in the electronic computing implementation is replaced with an optical computing module that may complete the convolution operation with high efficiency and low power consumption.

At S2, an electronic computing result is obtained by calculating the optical computing result through an electronic computing operation.

Specifically, the electronic computing module is configured to process the results of the optical computing module at the same level.

It may be understood that, the embodiments of the disclosure have proved that since the non-negative constraints imposed on the convolution kernel may greatly reduce the performance of the convolutional neural network, simple electronic computing is needed, such as introducing linear operations on a whole real number field or truncation operations, and cooperating with the optical convolution to achieve performance equivalent to or close to the electronic convolution. Specifically, when the optical computing result is $f_{opt}(x,y)$, the output of the electronic computing operation can be expressed in the equation (6).

$$f_{elec}(x,y)=H\{kf_{opt}(x,y)+b\} \quad (6)$$

where values in the real number field can be taken as k and b which are parameters to be optimized, and H is a certain fixed non-linear operation, such as ReLU, sigmoid, etc. which are often used in the neural network. It should be noted that all the electronic computing operations (such as linear operations and fixed non-linear operations) in the above equation can be implemented by designing analog circuits. Specifically, the input light signal reaches a surface of an image sensor after passing through the optical convolution module. The image sensor converts the light signal into an electronic signal, and the value can be changed through the designed analog circuit, that is, the simple electronic computing is completed. The electronic signals after the electronic computing can be used to manipulate programmable incoherent light sources, such as projectors, LCD screens, etc., so that the calculation result at the previous level can be projected as an input light source of the optical computing module at the next level, and so on, thus forming the cascading structure. The advantage of this is that, the speed and bandwidth bottlenecks caused by digital-to-analog conversion can be avoided by completing calculations through analog circuits. The conversion between light signals and electronic signals is seamless, thus forming a camera-free optoelectronic intelligent computing architecture.

At S3, it is determined whether cascading is required based on the electronic computing result. In response to determining the cascading is required, a cascade structure is formed by taking the electronic computing result at a previous level as an input of the optical computing module at a current level. In response to determining the cascading is not required, a final result is outputted.

It may be understood that the final output result in the disclosure may be interpreted in combination with hardware parameter optimization. Specifically, a joint optimization of optical and electronic parameters is completed by building a convolutional neural network based on a given task in the disclosure. For example, in the image classification task, the two-dimensional pixel distribution of the image in the data set can be used as an input of the network, and its corresponding classification label can be used as an output of the network.

Further, in the process of building a convolutional neural network, the disclosure takes advantage of high parallelism of the optical computing to convert multi-channel convolution into a single channel convolution. The specific operation is to stack multiple convolution kernels (matrices) in the multi-channel convolution in a plane in a way similar to puzzle stitching/splicing and form a large convolution kernel (matrix) as shown in FIG. 4a, where four convolution kernels with shapes of 0,1,2,3 are spliced together. The advantage of this is that, not only the performance improvement brought by the increase in the number of channels in the convolutional neural network can be used, but also multiple convolution operations can be completed through an optical propagation without considering the consumption of large-scale convolution in the electronic convolution, which can improve performance and efficiency.

Further, in the process of building a convolutional neural network, it is necessary to consider physical limitations of the system, such as the convolution kernel in the convolutional neural network must be non-negative due to the limitation from inherent properties of optical convolution. The multi-channel convolution result can be combined into a single channel in the above-mentioned manner, which in turn is used as an input of the convolution at a next level. This is distinct over a conventional convolutional neural network where the input and output are both multi-channel operations. In fact, according to the experimental results, the way of combining the multi-channel convolution result into a single channel convolution result may not significantly reduce the performance. This is similar with a situation where depth-wise separable convolution (channel-wise) reduces the calculation amount and parameters of the network by changing dense connections of the input to the output while the performance is ensured.

Further, the optical parameter optimization referring to the modulation plane parameters in the optical computing module are optimized through the large convolution kernel spliced in the previous step. As mentioned above, the two common optical path structures can be regarded as convolution operations, and optimizing a convolution kernel of the optical computing module can be regarded as optimizing an impulse intensity response function of the optical computing module. Assuming that the input plane is a 1×1 or 2×2 point light source, the output plane is a large convolution kernel pattern spliced. Selecting 1×1 or 2×2 depends on whether the pixel number in the total dimension is odd or even to ensure the system symmetry. The modulation plane parameters are continuously optimized in a gradient descent manner (such as an Adam optimizer is used), and an output pattern of the optical computing module for a point light source input is enabled to be as close as possible to a target large convolution kernel pattern based on a L1 norm loss function (i.e., maximum absolute value deviation function), until a value of the loss function is reduced below a certain threshold. For example, when it is assumed that the modulation plane can only adjust the phase of light and the output plane is required to be shown in FIG. 4a, the modulation plane parameters under the spatial modulation are shown in FIG. 4b, and the modulation plane parameters under the frequency domain modulation are shown in FIG. 4c.

As shown above, the electronic computing operations can obtain the optimized electrical parameters realized by the designed analog circuits. For application scenarios where delay and bandwidth requirements are not high, it can also be recorded by the image sensor to the computer first, and then projected on the screen after the computer completes simple image processing operations, as an input light source for the calculation module at the next level, and so on.

Further, the output at the last level can be determined by the task to be completed. For a classification task of n target types, the output may be converted into n values by fine-tuning an optical structure (such as adding an array of microlens) to converge the optical computing results to n pixels for further processing, or by performing a simple average pooling or max-pooling operation at the sensor side, and the classification result of the optoelectronic computing system is considered to be i in response to the i-th value being the largest. For a regression task, such as target tracking, saliency detection, key point extraction, etc., the output of the last level is in a form of a two-dimensional image for users to view or for other algorithms to continue processing.

According to an embodiment of the disclosure, the entire operation process of the disclosure is shown in FIG. 5.

FIG. 6 is a structural schematic diagram illustrating an apparatus for camera-free light field intelligent imaging with optoelectronic intelligent computing according to an embodiment of the disclosure. As shown in FIG. 6, the apparatus 10 includes: an optical computing module 100, an electronic computing module 200, and a determination module 300.

The optical computing module 100 is configured to obtain an optical computing result by receiving a light signal of an object or a scene to be imaged. The optical computing result includes light field imaging of the object/scene to be imaged. The optical computing module 100 may be implemented in a spatial modulation mode as shown in FIG. 3a or in a frequency domain modulation mode as shown in FIG. 3b.

The electronic computing module 200 is configured to obtain an electronic computing result by calculating the optical computing result through an electronic computing operation. The electronic computing module 200 may be implemented by analog circuits.

The determination module 300 is configured to in response to determining based on the electronic computing result that cascading is required, form a cascade structure by taking the electronic computing result at a previous level as an input of the optical computing module at a current level, and in response to determining that cascading is not required, output a final result.

According to the apparatus for camera-free light field intelligent imaging with optoelectronic intelligent computing in the embodiment of the disclosure, an optical computing result is obtained in response to receiving the light signal of the scene or object to be imaged by the optical computing module, in which the optical computing result is light field imaging of the scene or the object to be imaged; the electronic computing module is configured to obtain the electronic computing result by calculating the optical computing result through the electronic computing operation; the determination module is configured to in response to determining based on the electronic computing result that cascading is required, form the cascade structure by taking the electronic computing result at the previous level as an input of the optical computing module at the current level, and in response to determining that cascading is not required, output the final result. In other words, the light from the object or scene to be imaged is used to perform the optical computing, and an analog circuit is designed to realize a simple electronic computing, without additional analog-to-digital conversion and storage, which avoids information loss caused by the photoelectric conversion process and thus completes different types of computer vision tasks in a camera-free way with high efficiency and low power consumption.

In addition, the terms "first" and "second" are only for describing purposes and are not to be construed as indicating or implying relative importance or implicitly indicating the number of technical features indicated. Thus, features limiting "first" and "second" may explicitly or implicitly include at least one of the features. In the description of the disclosure, the wording "a plurality of" means at least two, for example, two, three, unless otherwise expressly and specifically stated.

In the description of the specification, descriptions with reference to terms "an embodiment", "some embodiments", "example", "specific example" or "some examples" mean specific features, structures, materials or characteristics described in combination with the embodiment or example are included in at least an embodiment or example of the disclosure. In this specification, the schematic representations of the above terms do not have to be the same embodiment or example. Moreover, specific features, structures, materials or characteristics described may be combined in one or more embodiments or examples in a suitable manner. Furthermore, embodiments or examples described in the specification, as well as features of embodiments or examples, may be combined without conflicting with each other.

Although the embodiments of the disclosure have been illustrated and described above, it may be understood that the above-mentioned embodiments are exemplary and should not be construed as a limitation to the disclosure. Those skilled in the art may make various changes, modifications, substitutions and alterations for the above-mentioned embodiments within the scope of the disclosure.

What is claimed is:

1. A method for camera-free light field imaging with optoelectronic intelligent computing, comprising:
    obtaining an optical computing result by an optical computing module in response to receiving a light signal of a scene or an object to be imaged, the optical computing result including light field imaging of the scene or the object to be imaged;
    calculating the optical computing result by performing an electronic computing operation to obtain an electronic computing result;
    determining whether cascading is required based on the electronic computing result;
    in response to determining that cascading is required, forming a cascade structure by taking the electronic computing result at a previous level as an input of the optical computing module at a current level, and in response to determining that cascading is not required, outputting a final electronic computing result;
    wherein the optical computing result is defined as $f_{opt}(x, y)$, and an output of the electronic computing operation is expressed by $$f_{elec}(x,y)=H\{kf_{opt}(x,y)+b\}$$

where k and b, as parameters to be optimized, take values in a real number domain, and H indicates a fixed non-linear operation; and wherein
    calculating the optical computing result by performing the electronic computing operation to obtain the electronic computing result comprises: converting by a sensor, an input light signal into an electrical signal, in which the input light signal reaches a surface of the sensor after passing through the optical computing module; and changing by a designed analog circuit, a value of the electrical signal to complete the electronic computing and obtain the electronic computing result.

2. The method of claim 1, wherein an operation completed by the optical computing module is a convolution operation; the optical computing module comprises a spatial modulation mode and a frequency domain modulation mode; and wherein:
    in the spatial modulation mode, the light signal freely propagates from an input plane to a modulation plane and from the modulation plane to an output plane; and
    in the frequency domain modulation mode, the light signal freely propagates from the input plane to the modulation plane via a lens, and from the modulation plane to the output plane via another lens, in which a distance between every two elements is a focal length of the lens.

3. The method of claim 1, wherein the electrical signal through the electronic computing operation is configured to manipulate a programmed incoherent light source to project the electronic computing result at the previous level as an input light source of the optical computing module at the next level, and to form the cascade structure.

4. The method of claim 1, further comprising:
    building a convolutional neural network for joint optimization of optical parameters and electrical parameters; and
    optimizing modulation plane parameters in the optical computing module based on the built convolutional neural network.

5. The method of claim 4, wherein performing joint optimization of optical parameters and electrical parameters by building the convolutional neural network comprises:
    converting a multi-channel convolution into a single channel convolution by using high parallelism of the optical computing in building the convolutional neural network, wherein multiple convolution kernels in the multi-channel convolution are stacked in a plane in a form of puzzle splicing to form a large convolution kernel.

6. The method of claim 5, wherein optimizing modulation plane parameters in the optical computing module based on the built convolutional neural network comprises:
    optimizing the modulation plane parameters in a gradient descent manner based on the spliced large convolution kernel, and enabling an output pattern of the optical computing module for a point light source input to be close to a target convolution kernel pattern based on a L1 norm loss function, until a value of the loss function is reduced below a preset threshold.

7. The method of claim 5, wherein an output form at the last level depends on a task to be completed, for a classification task of n target types, the output at the last level is converted to n values by fine-tuning an optical structure to converge the optical computing results to n pixels for further receiving, or by performing a pooling operation at a sensor side, and a classification result is i in response to the i-th value being the largest among the n values; and for a regression task, the output at the last level includes a two-dimensional image.

8. An apparatus for camera-free light field imaging with optoelectronic intelligent computing, comprising:

an optical computing module, configured to obtain an optical computing result in response to receiving a light signal of a scene or an object to be imaged, the optical computing result including light field imaging of the scene or the object to be imaged;

an electronic computing module, configured to calculate the optical computing result by performing an electronic computing operation to obtain an electronic computing result;

a determination module, configured to determine whether cascading is required based on the electronic computing result, in response to determining that cascading is required, form a cascade structure by taking the electronic computing result at a previous level as an input of the optical computing module at a current level, and in response to determining that cascading is not required, output a final electronic computing result;

wherein the optical computing result is defined as $f_{opt}(x, y)$, and an output of the electronic computing operation is expressed by $$f_{elec}(x,y)=H\{kf_{opt}(x,y)+b\}$$

where k and b, as parameters to be optimized, take values in a real number domain, and H indicates a fixed non-linear operation; and wherein calculating the optical computing result by performing the electronic computing operation to obtain the electronic computing result comprises: converting by a sensor, an input light signal into an electrical signal, in which the input light signal reaches a surface of the sensor after passing through the optical computing module; and changing by a designed analog circuit, a value of the electrical signal to complete the electronic computing and obtain the electronic computing result.

\* \* \* \* \*